(12) United States Patent
Kawakita et al.

(10) Patent No.: US 10,786,872 B2
(45) Date of Patent: Sep. 29, 2020

(54) WELDING METHOD

(71) Applicant: TOYOTA JIDOSHA KABUSHIKI KAISHA, Toyota-shi, Aichi-ken (JP)

(72) Inventors: Atsushi Kawakita, Miyoshi (JP); Shuhei Ogura, Nagakute (JP); Hiroki Sugino, Toyota (JP); Wataru Mizuno, Toyota (JP); Ryuta Matsuo, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 290 days.

(21) Appl. No.: 16/007,537

(22) Filed: Jun. 13, 2018

(65) Prior Publication Data

US 2018/0361508 A1 Dec. 20, 2018

(30) Foreign Application Priority Data

Jun. 15, 2017 (JP) .................................. 2017-117980
May 25, 2018 (JP) .................................. 2018-100779

(51) Int. Cl.
*B23K 26/346* (2014.01)
*B23K 9/007* (2006.01)
(Continued)

(52) U.S. Cl.
CPC ............ *B23K 26/346* (2015.10); *B23K 9/007* (2013.01); *B23K 11/115* (2013.01);
(Continued)

(58) Field of Classification Search
CPC .... B23K 26/346; B23K 26/082; B23K 26/21; B23K 26/244; B23K 9/007; B23K 11/115;
(Continued)

(56) References Cited

U.S. PATENT DOCUMENTS 5,599,469 A * 2/1997 Yoshino ................. B23K 10/02
219/121.46
2004/0000539 A1 * 1/2004 Takikawa ............. B23K 26/244
219/121.64
(Continued)

FOREIGN PATENT DOCUMENTS

CN 103492117 A 1/2014
JP 2008-290149 A 12/2008
(Continued)

*Primary Examiner* — Jimmy Chou
(74) *Attorney, Agent, or Firm* — Oliff PLC

(57) ABSTRACT

A welding method for integrally welding three or more superposed metal plates includes a spot welding of joining the first vehicle body structure plate and the second vehicle body structure plate by spot welding in a plurality of places along an opening edge of the door opening portion in a state where each of the metal plates is superposed, and a laser welding of joining the surface plate and the first vehicle body structure plate in a plurality of places including a place between welding places of the spot welding after the spot welding. The joining being performed by emitting laser light to the surface plate and by scanning the laser light to stir a molten pool including a molten metal of the surface plate and the first vehicle body structure plate melted by the laser light.

3 Claims, 11 Drawing Sheets

(51) Int. Cl.
  *B23K 26/082* (2014.01)
  *B23K 28/02* (2014.01)
  *B23K 26/21* (2014.01)
  *B23K 11/11* (2006.01)
  *B23K 26/08* (2014.01)
  *B23K 26/244* (2014.01)
  *B23K 101/00* (2006.01)
  *B23K 103/04* (2006.01)

(52) U.S. Cl.
  CPC ........ *B23K 26/082* (2015.10); *B23K 26/0884* (2013.01); *B23K 26/21* (2015.10); *B23K 26/244* (2015.10); *B23K 28/02* (2013.01); *B23K 2101/006* (2018.08); *B23K 2103/04* (2018.08)

(58) Field of Classification Search
  CPC  B23K 26/0884; B23K 28/02; B23K 2103/04; B23K 2101/006
  USPC .......................... 219/121.63, 121.64, 121.83
  See application file for complete search history.

(56) References Cited

U.S. PATENT DOCUMENTS

| | | | | |
|---|---|---|---|---|
| 2005/0121426 | A1* | 6/2005 | Wang | B23K 26/244 219/121.64 |
| 2008/0237203 | A1* | 10/2008 | Tanaka | C09J 5/06 219/121.64 |
| 2009/0050608 | A1* | 2/2009 | Hayashi | B23K 11/115 219/121.14 |
| 2013/0168371 | A1* | 7/2013 | Furusako | B23K 26/082 219/121.64 |
| 2014/0048518 | A1 | 2/2014 | Ogura et al. | |
| 2014/0291304 | A1* | 10/2014 | Mudd, II | B23K 26/32 219/121.61 |
| 2015/0174702 | A1* | 6/2015 | Fujimoto | B23K 26/60 428/594 |
| 2015/0183058 | A1* | 7/2015 | Sugiyama | B23K 26/32 219/121.64 |
| 2015/0209909 | A1* | 7/2015 | Shimada | B23K 26/32 403/271 |
| 2015/0246413 | A1* | 9/2015 | Kawakita | G01J 1/42 219/121.64 |
| 2015/0298257 | A1* | 10/2015 | Townson | B62D 25/085 219/121.64 |
| 2016/0016261 | A1* | 1/2016 | Mudd, II | B23K 26/32 219/121.61 |
| 2016/0045970 | A1* | 2/2016 | Garcia | B23K 26/322 219/121.64 |
| 2016/0046330 | A1* | 2/2016 | Elfwing | B62D 21/02 296/193.01 |
| 2016/0067832 | A1* | 3/2016 | Kobayashi | B23K 26/24 219/121.83 |
| 2017/0050269 | A1* | 2/2017 | Nakagawa | B23K 26/0626 |
| 2017/0232553 | A1* | 8/2017 | Sievi | B23K 26/0869 219/121.64 |
| 2017/0334023 | A1* | 11/2017 | Mohr | B22F 7/062 |
| 2018/0117671 | A1* | 5/2018 | Fujikawa | B22D 41/015 |
| 2018/0117672 | A1* | 5/2018 | Fujikawa | B22D 17/10 |
| 2018/0361506 | A1* | 12/2018 | Tateyama | B23K 26/0608 |
| 2018/0361508 | A1* | 12/2018 | Kawakita | B23K 26/346 |
| 2019/0366479 | A1* | 12/2019 | Hioki | B23K 26/082 |

FOREIGN PATENT DOCUMENTS

| | | |
|---|---|---|
| JP | 2010-264503 A | 11/2010 |
| JP | 2012-115876 A1 | 6/2012 |
| JP | 2012-228715 A | 11/2012 |
| JP | 2014-073769 A | 4/2014 |
| JP | 2014-223669 A | 12/2014 |
| JP | 2017-131916 A | 8/2017 |
| WO | 2012/146965 A1 | 11/2012 |

* cited by examiner

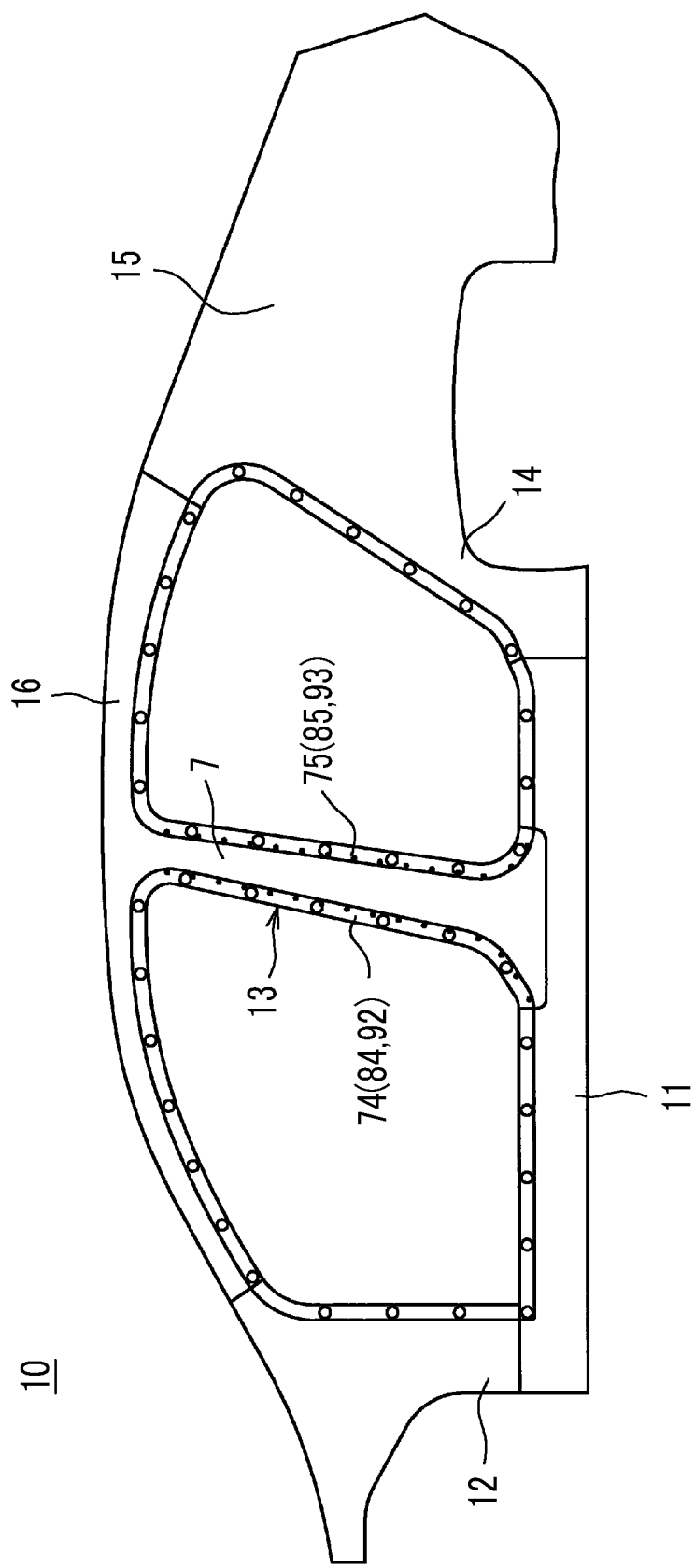

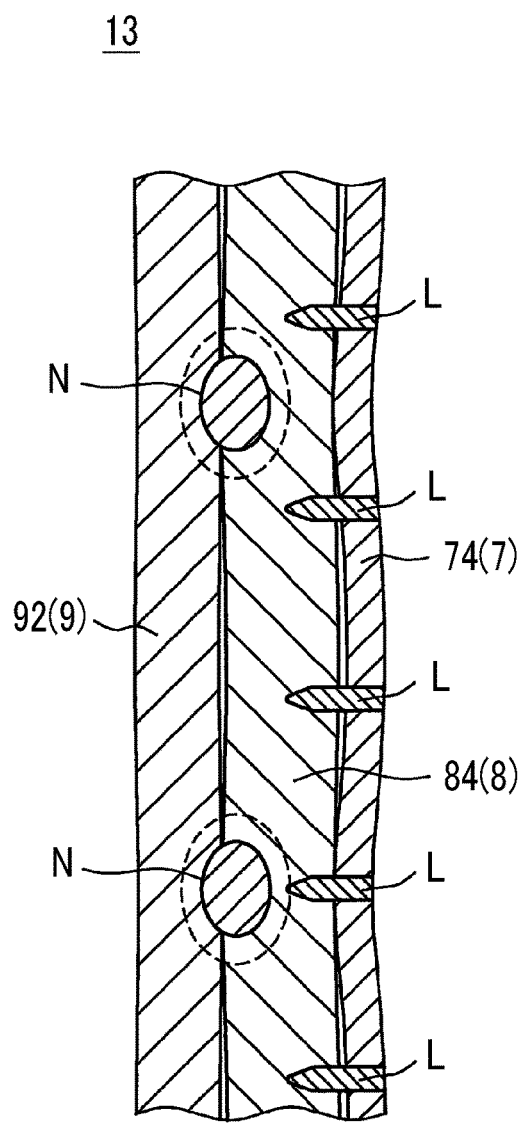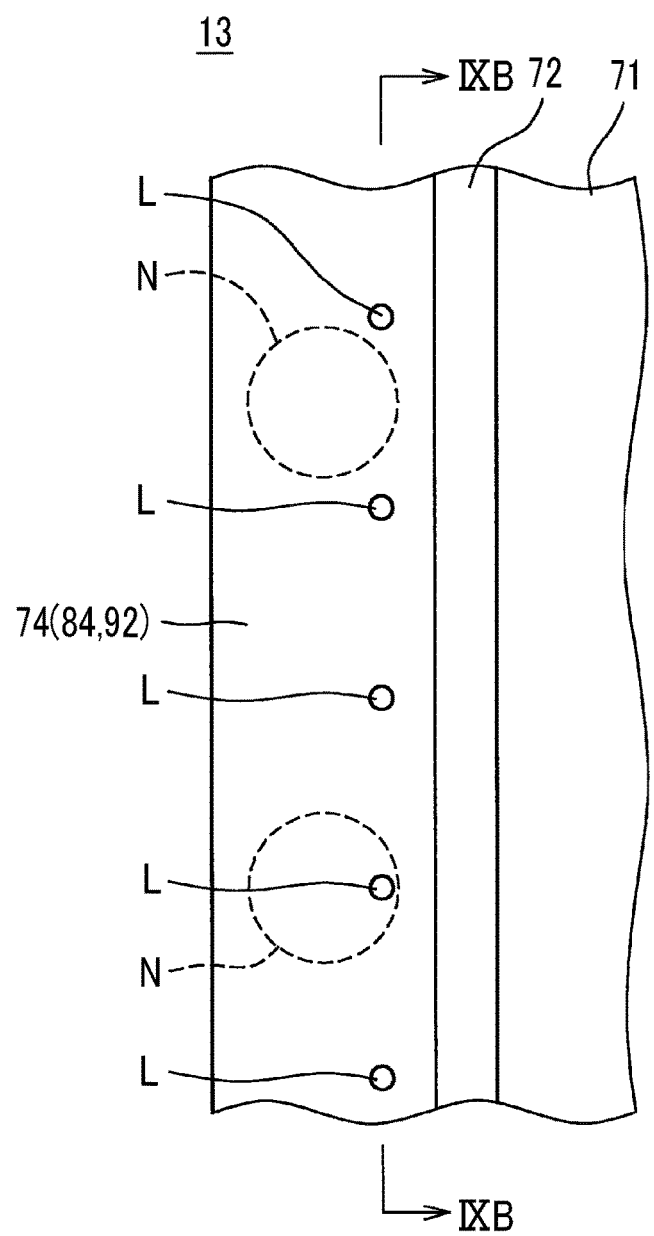

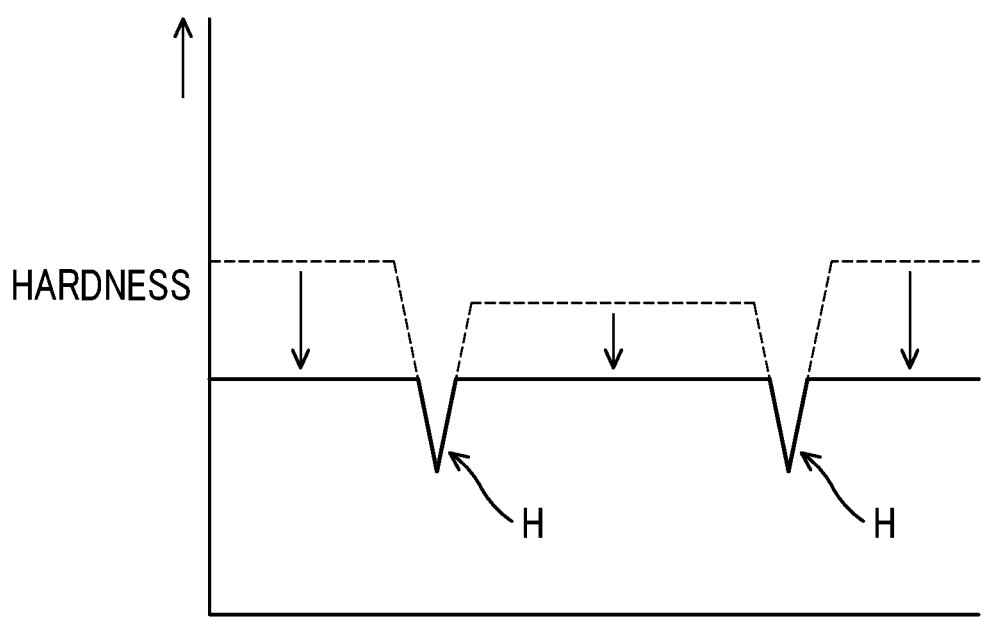

WELDING METHOD

INCORPORATION BY REFERENCE

The disclosure of Japanese Patent Application No. 2018-100779 filed on May 25, 2018 including the specification, drawings and abstract is incorporated herein by reference in its entirety.

BACKGROUND

1. Technical Field

The disclosure relates to a welding method for welding three or more superposed metal plates constituting a member around a door opening portion of the vehicle body of an automobile.

2. Description of Related Art

In the vehicle body of an automobile according to the related art, a closed sectional structure formed by a plurality of metal plates constitutes a member (such as various pillars) around a door opening portion so that the torsional rigidity of the vehicle body is improved, the deformation amount during a vehicle collision is reduced, and so on. For example, a surface plate as a skin material is welded to the surface of a skeleton member configured to have the closed sectional structure. Accordingly, three or more metal plates need to be integrally welded for the member around the door opening portion.

Integral joining of three metal plates by spot welding is disclosed in Japanese Unexamined Patent Application Publication No. 2014-73769 (JP 2014-73769 A). Specifically, a center pillar inner panel, a center pillar outer reinforcement, and a side outer panel constitute a center pillar constituting a vehicle body, the center pillar outer reinforcement with a hat-shaped section and the substantially flat plate-shaped center pillar inner panel constitute a closed sectional structure, and the side outer panel with a hat-shaped section is welded to the outside of the center pillar outer reinforcement. More specifically, the flange portions formed at the width-direction outer side portions of the respective panels are superposed on each other and the flange portions are integrally joined by spot welding.

SUMMARY

In a case where three or more metal plates (the center pillar inner panel, the center pillar outer reinforcement, and the side outer panel in the case of JP 2014-73769 A) are joined by spot welding alone, however, a welding nugget that is formed by the spot welding needs to be formed over each metal plate, and thus the diameter of the welding nugget needs to be increased. Accordingly, the width dimension of the flange portion of each panel needs to be increased (exceed the diameter of the welding nugget that is needed), and then the size of the center pillar increases and vehicle body weight reduction is hardly achieved.

Although vehicle body weight reduction based on a decrease in the thickness of the side outer panel is desirable in a case where the closed sectional structure that the center pillar inner panel and the center pillar outer reinforcement constitute is responsible for most of vehicle body rigidity, the decrease in the thickness of the side outer panel is limited if the welding nugget is formed also in the side outer panel. In other words, as the welding nugget is formed in the substantially middle portion of each superposed panel as a whole in the plate thickness direction in most cases, a certain degree of plate thickness dimension is needed also for the side outer panel to form the welding nugget in the side outer panel. This also hampers vehicle body weight reduction. Specifically, formation of the welding nugget also in the side outer panel becomes difficult in a case where the ratio of the plate thickness dimension of the side outer panel to the total plate thickness dimension (plate thickness dimension of all of the superposed panels) is less than ⅕. Accordingly, in a case where the metal plates are joined to each other by spot welding alone, the ratio needs to be equal to or greater than ⅕ and vehicle body weight reduction based on a decrease in the thickness of the side outer panel is limited.

The disclosure provides a welding method by which sufficient vehicle body rigidity can be obtained and vehicle body weight reduction can be achieved when three or more superposed metal plates are welded.

An aspect relates to a welding method for integrally welding three or more superposed metal plates constituting a member around a door opening portion of a vehicle body and including a surface plate positioned on a vehicle body surface side, a first vehicle body structure plate adjacent to a vehicle cabin inside of the surface plate, and a second vehicle body structure plate adjacent to a vehicle cabin inside of the first vehicle body structure plate. The welding method includes a spot welding of joining the first vehicle body structure plate and the second vehicle body structure plate by spot welding in a plurality of places along an opening edge of the door opening portion in a state where each of the metal plates is superposed, and a laser welding of joining the surface plate and the first vehicle body structure plate in a plurality of places including a place between welding places of the spot welding after the spot welding, the joining being performed by emitting laser light to the surface plate and by scanning the laser to stir a molten pool including a molten metal of the surface plate and the first vehicle body structure plate melted by the laser light.

According to the aspect, when the surface plate, first vehicle body structure plate, and second vehicle body structure plate constituting the member around the door opening portion of the vehicle body are welded, the first vehicle body structure plate and the second vehicle body structure plate are superposed and joined first by the spot welding in the places along the opening edge of the door opening portion in the state where the metal plates are superposed. Subsequently, in the places including the place between the welding places of the spot welding, the surface plate and the first vehicle body structure plate are joined by laser welding performed by emitting the laser light to the surface plate. During the laser welding at this time, the molten pool including the molten metal of the surface plate and the first vehicle body structure plate melted by the laser light is stirred by the scanning with the laser light. As a result, the molten metal is clustered by the surface tension of the molten metal forming the molten pool and interposed between the surface plate and the first vehicle body structure plate, and thus the surface plate and the first vehicle body structure plate are welded.

In the spot welding, the welding place is pinched by spot welding electrodes, and thus the gap between the surface plate and the first vehicle body structure plate tends to increase in the region between the spot welding places due to the deformation of the surface plate. However, the gap between the surface plate and the first vehicle body structure plate is filled with the molten metal by the stirring of the molten pool resulting from the laser light scanning described above, and thus the surface plate and the first vehicle body structure plate can be welded in a satisfactory manner.

The laser welding described above is effective also when there is no gap between the surface plate and the first vehicle body structure plate. In other words, zinc vapor may explode in the molten metal to result in an empty hole at the joining part when the metal plates are galvanized steel plates and there is no gap between the surface plate and the first vehicle body structure plate in the general laser welding according to the related art. However, according to the laser welding of the aspect, zinc vapor can be discharged in a satisfactory manner by the stirring of the molten pool and a hole becoming empty at the joining part can be suppressed, even when there is no gap between the surface plate and the first vehicle body structure plate.

As described above, by the welding method according to the aspect, the three or more metal plates can be integrally joined by the spot welding and the laser welding being used in conjunction with each other. In other words, since the three or more metal plates are not joined by the spot welding alone, the diameter of a welding nugget does not have to be increased (the diameter of a welding nugget does not have to be increased since the welding nugget does not have to be formed over each metal plate) and the weight of the vehicle body can be reduced by the width dimension of the joining part (such as a flange portion) of each metal plate being minimized. Since the surface plate and the first vehicle body structure plate are joined by the laser welding, the welding nugget for the spot welding does not have to be formed in the surface plate and the thickness of the surface plate can be reduced, which also leads to vehicle body weight reduction. In addition, although the spot welding imposes a constraint on a decrease in welding pitch by having the possibility of occurrence of a split flow, which is a phenomenon in which a current flowing through a welding place to be welded flows into an already welded welding place present in the vicinity of the welding place, sufficient vehicle body rigidity can be maintained by the laser welding free from the welding pitch constraint being used in conjunction. As described above, according to the aspect, sufficient vehicle body rigidity can be obtained and vehicle body weight reduction can be achieved when welding is performed to the three or more metal plates superposed.

In the welding method according to the aspect, a condition of the laser light in the laser welding may be set to a value at which the laser light melts the surface plate and the first vehicle body structure plate without penetrating the first vehicle body structure plate and such that the molten pool is allowed to be formed.

According to the above, in the laser welding, the surface plate and the first vehicle body structure plate can be welded at the minimum laser light energy amount needed for the molten pool to be formed by the surface plate and the first vehicle body structure plate being melted.

In the welding method according to the aspect, at least one of the first vehicle body structure plate and the second vehicle body structure plate may be an ultra high tensile steel plate and the surface plate may be a steel plate lower in hardness than the first vehicle body structure plate and the second vehicle body structure plate, and the surface plate and the first vehicle body structure plate may be bonded by laser light being emitted to an outside of a heat affected zone around the welding place of the spot welding in a laser welding performed after the spot welding. The ultra high tensile steel plate mentioned here is more excellent in terms of tensile strength than a normal high tensile steel plate. For example, the ultra high tensile steel plate mentioned here is an ultra high tension material or a hot stamp material.

In general spot welding of an ultra high tensile steel plate, the heat that is generated during the welding causes a heat affected zone around a welding place to be lower in hardness than a base material (part not affected by heat). At this hardness-reduced part, stress concentration is likely to occur when an external force acts, and then no sufficient member strength may be maintainable. According to the aspect, the outside of the heat affected zone around the welding place by the spot welding is heated (heat input is performed thereon) by the laser welding being implemented, and the vicinity of the heat affected zone is tempered as a result. Then, the hardness of the tempered part can become close to the hardness of the heat affected zone. As a result of the above, stress concentration in the heat affected zone is unlikely to occur when an external force acts and member strength improvement can be achieved as a result.

According to the aspect, the surface plate and the first vehicle body structure plate are joined by the laser light emitted from the surface plate side, and the laser light is scanned on the molten pool including the molten metal of the surface plate and the first vehicle body structure plate melted to stir the molten pool in the places including the place between the welding places of the spot welding after the first vehicle body structure plate and the second vehicle body structure plate are joined by the spot welding when the three or more superposed metal plates including the surface plate, the first vehicle body structure plate, and the second vehicle body structure plate are welded. As a result, the width dimension of the joining part (such as the flange portion) of each metal plate can be reduced, and the thickness of the surface plate can be reduced and each metal plate can be joined with higher joining strength at the same time. As a result, sufficient vehicle body rigidity can be obtained and vehicle body weight reduction can be achieved at the same time.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a side view of the vehicle body for showing a laser welding place in a laser welding step;

FIG. 9A is an enlarged view of a laser welding part at a time of laser welding step termination; and FIG. 9B is a cross-sectional view taken along line IXB-IXB of FIG. 9A.

FIG. 13 is a graph illustrating a result of hardness measurement at the one-dot chain line A-A part in FIG. 12B.

DETAILED DESCRIPTION OF EMBODIMENTS

Hereinafter, an embodiment will be described with reference to accompanying drawings. A case will be described where a welding method according to the embodiment is applied to welding between metal plates constituting a center pillar (referred to as a B pillar in some cases) as a member around a door opening portion of a vehicle body. The welding method according to the embodiment is also applicable to welding between metal plates constituting another member (such as a rocker panel to be described later) around the door opening portion of the vehicle body.

Configuration of Vehicle Body

Figure 1:
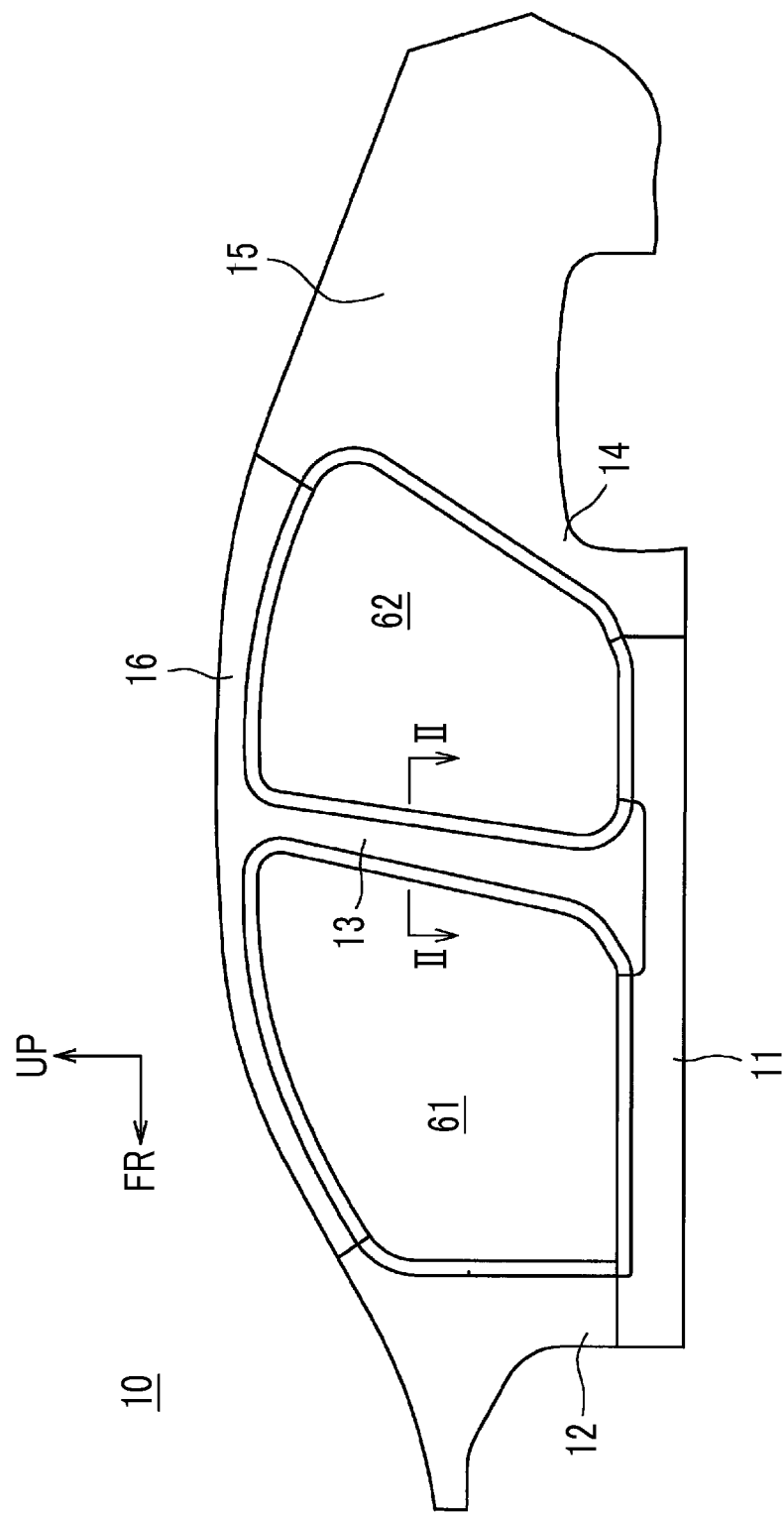
FIG. 1 is a side view illustrating a vehicle body produced by a welding method according to an embodiment.

FIG. 1 is a side view illustrating a vehicle body 10 produced by the welding method according to the present embodiment. In FIG. 1, the arrow FR indicates the vehicle body front side and the arrow UP indicates the vehicle body upper side.

In the vehicle body 10, a rocker panel 11 extends along the vehicle body front-rear direction in the lower portion of the vehicle body side portion as illustrated in FIG. 1. A front pillar 12 extends upward from the front end portion of the rocker panel 11. A center pillar 13 extends upward from the middle portion of the rocker panel 11 in the vehicle body front-rear direction. In addition, a rear pillar 14 extends upward from the rear end portion of the rocker panel 11. The rear pillar 14 is formed integrally with a rear fender panel 15. A roof side rail 16 extending along the vehicle body front-rear direction is joined (welded) to each of the upper end portion of the front pillar 12, the upper end portion of the center pillar 13, and the upper end portion of the rear pillar 14.

A front side door opening portion 61 substantially rectangular in vehicle body side view is formed by the front side part of the rocker panel 11, the front pillar 12, the front side part of the roof side rail 16, and the center pillar 13. A rear side door opening portion 62 substantially rectangular in vehicle body side view is formed by the rear side part of the rocker panel 11, the center pillar 13, the rear side part of the roof side rail 16, and the rear pillar 14. In other words, the rocker panel 11, the front pillar 12, the center pillar 13, the rear pillar 14, and the roof side rail 16 described above are members around the door opening portions of the vehicle body.

Configuration of Center Pillar

Figure 2:
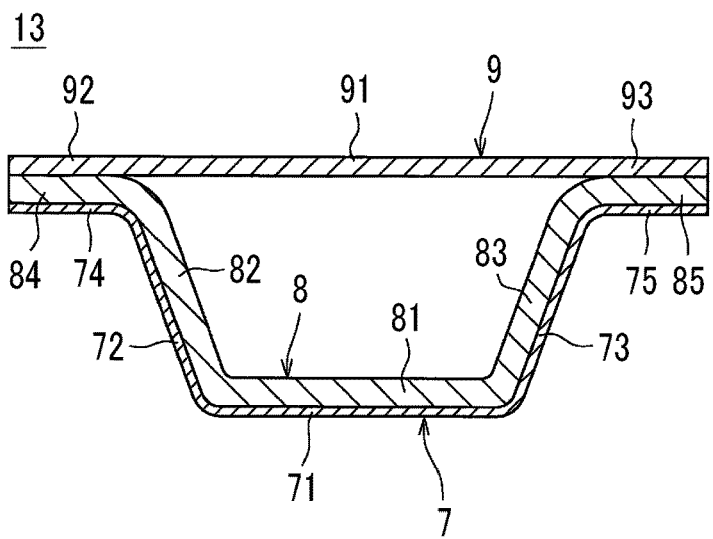
FIG. 2 is a cross-sectional view of a center pillar taken along line II-II of FIG. 1.

FIG. 2 is a cross-sectional view of the center pillar 13 taken along line II-II of FIG. 1. As illustrated in FIG. 2, the center pillar 13 is configured by a side outer panel 7 as a surface plate positioned on the vehicle body surface side, a center pillar outer reinforcement 8 as a first vehicle body structure plate disposed adjacent to the inside of the vehicle width direction (vehicle cabin inside of the side outer panel 7) with respect to the side outer panel 7, and a center pillar inner panel 9 disposed adjacent to the inside of the vehicle width direction (vehicle cabin inside of the center pillar outer reinforcement 8) with respect to the center pillar outer reinforcement 8 being integrally welded.

A steel plate forms the center pillar outer reinforcement 8, and the sectional shape of the center pillar outer reinforcement 8 is a hat shape open to the inside of the vehicle width direction. In other words, the center pillar outer reinforcement 8 is provided with a first plate portion 81 extending along the vehicle body front-rear direction and the vehicle body up-down direction, a front side second plate portion 82 extending from the end edge of the first plate portion 81 on the vehicle body front side toward the inside of the vehicle width direction, a rear side second plate portion 83 extending from the end edge of the first plate portion 81 on the vehicle body rear side toward the inside of the vehicle width direction, a front side flange portion 84 extending from the tip edge of the front side second plate portion 82 (tip edge on the inside of the vehicle width direction) toward the vehicle body front side, and a rear side flange portion 85 extending from the tip edge of the rear side second plate portion 83 (tip edge on the inside of the vehicle width direction) toward the vehicle body rear side. The first plate portion 81, the front side second plate portion 82, and the rear side second plate portion 83 constitute the pillar body portion of the first vehicle body structure plate. In other words, the flange portions 84, 85 are continuously formed at both width-direction outer portions of the pillar body portion, respectively. The width-direction outer portions of the pillar body portion are outer portions of the pillar body portion in its width direction (hereafter, referred to as "width direction outer portions of the pillar body portion).

A flat plate-shaped steel plate forms the center pillar inner panel 9. The width dimension (dimension in the vehicle body front-rear direction) of the center pillar inner panel 9 is substantially equal to the dimension of the center pillar outer reinforcement 8 in the vehicle body front-rear direction. The center pillar inner panel 9 is provided with a body portion (pillar body portion) 91 facing each of the first plate portion 81 and the second plate portions 82, 83 in a state where the center pillar inner panel 9 is welded to the center pillar outer reinforcement 8 (state illustrated in FIG. 2), a front side flange portion 92 welded to the front side flange portion 84 of the center pillar outer reinforcement 8, and a rear side flange portion 93 welded to the rear side flange portion 85 of the center pillar outer reinforcement 8. In other words, the flange portions 92, 93 are continuously formed at both width-direction outer portions of the body portion 91, respectively. The center pillar outer reinforcement 8 and the center pillar inner panel 9 constitute a closed sectional structure by being welded as described above.

A steel plate forms the side outer panel 7, and the side outer panel 7 is a plate material constituting the design surface of the center pillar 13. The sectional shape of the side outer panel 7 is a hat shape open to the inside of the vehicle width direction as is the case with the center pillar outer reinforcement 8. In other words, the side outer panel 7 is provided with a first plate portion 71 extending along the vehicle body front-rear direction and the vehicle body up-down direction and superposed on the outside surface of the first plate portion 81 of the center pillar outer reinforcement 8, a front side second plate portion 72 extending from the end edge of the first plate portion 71 on the vehicle body front side toward the inside of the vehicle width direction and superposed on the outside surface of the front side second plate portion 82 of the center pillar outer reinforcement 8, and a rear side second plate portion 73 extending from the end edge of the first plate portion 71 on the vehicle body rear side toward the inside of the vehicle width direction and superposed on the outside surface of the rear side second plate portion 83 of the center pillar outer reinforcement 8. The side outer panel 7 is provided with a front side flange portion 74 extending from the tip edge of the front side second plate portion 72 toward the vehicle body front side and superposed on the outside surface of the front side flange portion 84 of the center pillar outer reinforcement 8 and a rear side flange portion 75 extending from the tip edge of the rear side second plate portion 73 toward the vehicle body rear side and superposed on the outside surface of the rear side flange portion 85 of the center pillar outer reinforcement 8. The first plate portion 71, the front side second plate portion 72, and the rear side second plate portion 73 constitute the pillar body portion of the surface plate. In other words, the flange portions 74, 75 are continuously formed at both width-direction outer portions of the pillar body portion, respectively.

Regarding the plate thickness dimension relationship of the side outer panel 7, the center pillar outer reinforcement 8, and the center pillar inner panel 9, the plate thickness dimension of the center pillar outer reinforcement 8 is the largest and the plate thickness dimension of the side outer panel 7 is the smallest among the plate thickness dimensions of the above-described members as a result of setting. For example, the plate thickness dimension of the center pillar outer reinforcement 8 is set to a predetermined value ranging from 2.4 mm to 3.0 mm, the plate thickness dimension of the center pillar inner panel 9 is set to a predetermined value ranging from 1.1 mm to 2.3 mm, and the plate thickness dimension of the side outer panel 7 is set to a predetermined value ranging from 0.3 mm to 1.0 mm. Each of the plate thickness dimensions is set such that the ratio of the total plate thickness dimension (sum of the plate thickness dimension of the side outer panel 7, the plate thickness dimension of the center pillar outer reinforcement 8, and the plate thickness dimension of the center pillar inner panel 9) to the plate thickness dimension of the side outer panel 7 is at least "5". This is because the center pillar outer reinforcement 8 and the center pillar inner panel 9 are members responsible for vehicle body rigidity and, as such, are given plate thickness dimensions from which sufficient vehicle body rigidity can be obtained. Also, the side outer panel 7 as the plate material constituting the design surface of the center pillar 13 has the smallest plate thickness dimension as a result of the setting so that the side outer panel 7 contributes to vehicle body weight reduction. The setting range of the plate thickness dimension ratio has a maximum value of "10". The maximum value is not limited thereto.

Laser Welding Apparatus

As described later, the side outer panel 7, the center pillar outer reinforcement 8, and the center pillar inner panel 9 are integrally joined by spot welding and laser welding being used in conjunction with each other. The spot welding is performed by a spot welding apparatus and the laser welding is performed by a laser welding apparatus. The welding apparatuses are disposed in welding step places on a vehicle body production line, and the spot welding apparatus is disposed upstream of the laser welding apparatus on the vehicle body production line. Accordingly, the laser welding by the laser welding apparatus is performed after the spot welding (welding of each portion of the vehicle body 10) by the spot welding apparatus is performed.

A general spot welding apparatus known in the related art is used as the spot welding apparatus, and thus description thereof will be omitted (refer to, for example, Japanese Unexamined Patent Application Publication No. 2008-290149 (JP 2008-290149 A)).

The laser welding apparatus is to stir a molten pool including a molten metal melted by laser light by laser light scanning unlike in general laser welding. The "scanning" means changing the laser light emission position while emitting the laser light. In general, the above-described welding method is referred to as laser screw welding (LSW). The laser welding apparatus will be described below.

Figure 3:
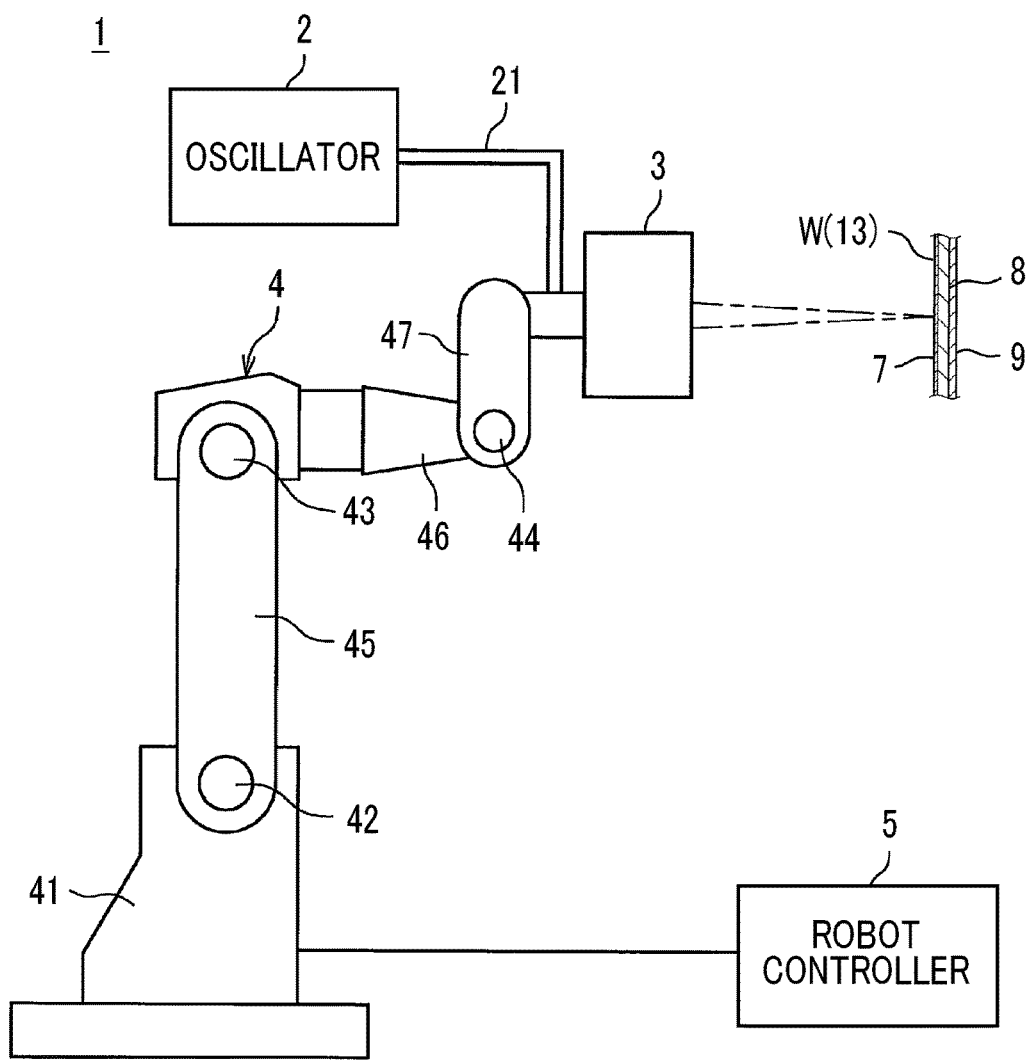
FIG. 3 is a schematic configuration diagram illustrating a laser welding apparatus used for laser welding.

FIG. 3 is a schematic configuration diagram illustrating a laser welding apparatus 1. As illustrated in FIG. 3, the laser welding apparatus 1 is provided with a laser oscillator 2, a laser scanner 3, a welding robot 4, and a robot controller 5.

The laser oscillator 2 generates laser light. The generated laser light is guided to the laser scanner 3 through an optical fiber cable 21. Carbon dioxide laser, yttrium aluminum garnet (YAG) laser, fiber laser, and so on can be used as the laser light.

The laser scanner 3 irradiates a work W (such as the center pillar 13) with the laser light guided through the optical fiber cable 21 (refer to the one-dot chain line in FIG. 3). A lens group (not illustrated) and a plurality of mirrors (not illustrated) are accommodated in the laser scanner 3. The lens group is provided with, for example, a collimate lens for turning the laser light into parallel light and a condenser lens condensing the laser light such that the laser light focuses on a processing point of the work W (predetermined laser irradiation position on the work W). Each of the mirrors is configured to be rotatable about one rotation axis. Laser light scanning can be performed within a predetermined range of the work W by laser light scanning being performed by the mirrors. Each of the mirrors can be configured by, for example, a galvano mirror being used.

As described above, the laser welding according to the present embodiment is laser screw welding (LSW). In other words, the welding is performed by a welding portion (welding place) of the work W being melted by laser light scanning being performed over the entire circumference of the periphery of the central position of the welding portion. The laser light scanning is performed by each of the mirrors.

The welding robot 4 is configured such that the laser scanner 3 is movable. An articulated robot constitutes the welding robot 4. Specifically, in the present embodiment, the welding robot 4 is provided with a base stand 41, a rotation mechanism (not illustrated) accommodated in the base stand 41, joints 42, 43, 44, and arms 45, 46, 47. The laser scanner 3 can be moved in any direction by the rotation operation of the rotation mechanism and the swing operation of the arms 45, 46, 47 at the respective joints 42, 43, 44.

Information (information such as the rotation angle amount of each of the joints 42, 43, 44) for moving the laser scanner 3 toward the welding place is stored by prior offline teaching in the robot controller 5. When the vehicle body is transported up to the welding step place on the vehicle body production line, the welding robot 4 is operated based on the information in accordance with a control signal from the robot controller 5. As a result, sequential LSW is performed with respect to each welding place.

Welding Operation

The welding operation for producing the vehicle body 10 will be described below. Especially, the welding operation for integrally joining the side outer panel 7, the center pillar outer reinforcement 8, and the center pillar inner panel 9 constituting the center pillar 13 will be mainly described below.

During the welding operation, a body skeleton welding step, a spot welding step, and a laser welding step are sequentially performed on the vehicle body production line.

Figure 4:
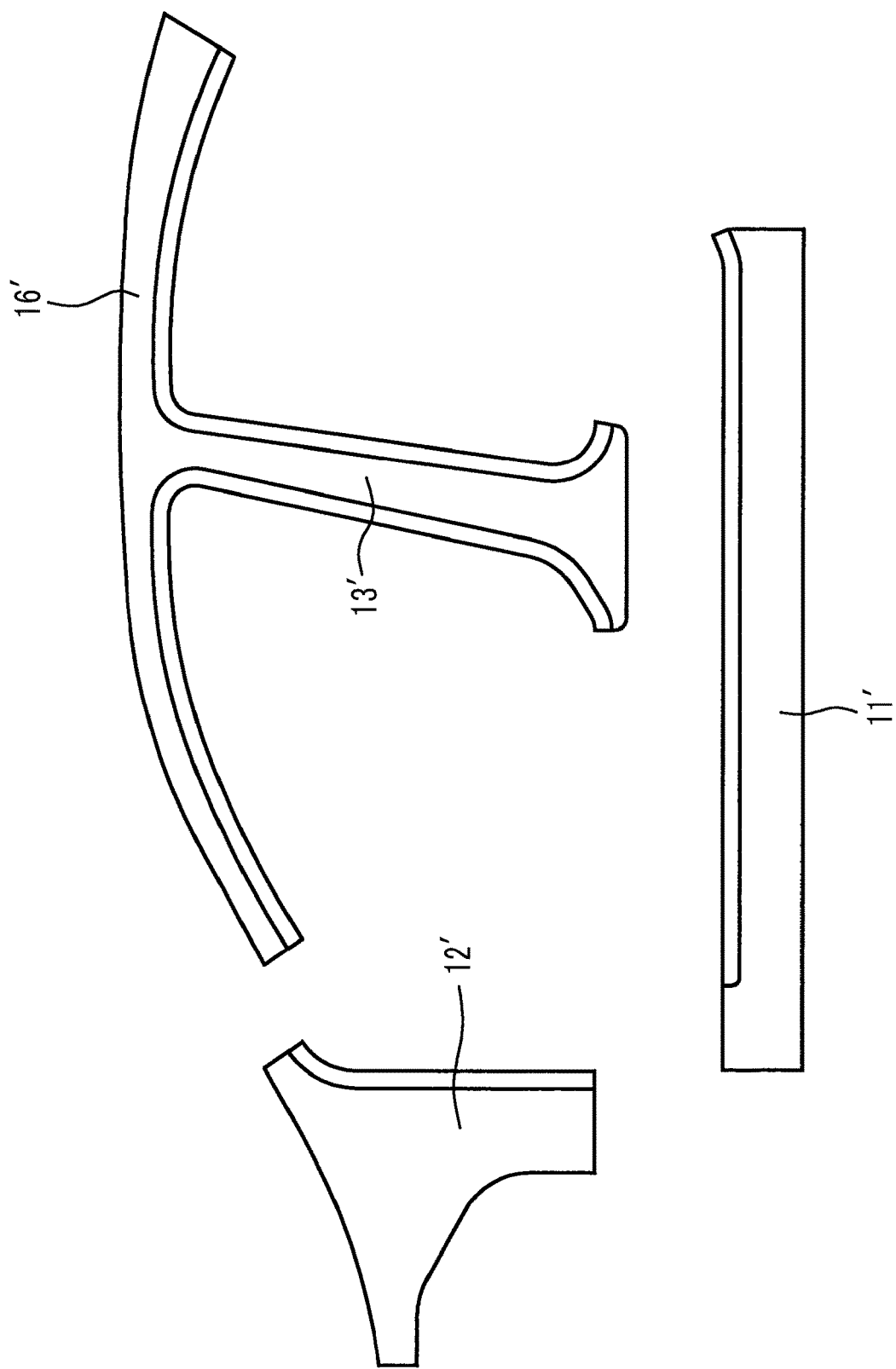
FIG. 4 is a side view for showing body skeleton welding work.

FIG. 4 is a side view for showing the body skeleton welding step. As illustrated in FIG. 4, respective skeleton members 11', 12', 13', 16' of the rocker panel 11, the front pillar 12, the center pillar 13, and the roof side rail 16 are integrally welded to each other in the body skeleton welding step. In FIG. 4, the skeleton member 13' of the center pillar 13 and the skeleton member 16' of the roof side rail 16 are already welded. The skeleton members 11', 12', 13', 16' are members of a closed sectional structure formed by a reinforcement (center pillar outer reinforcement 8 in the center pillar 13) and an inner panel (center pillar inner panel 9 in the center pillar 13) being welded (temporarily fixed) with an outer panel (side outer panel 7 in the center pillar 13) as a skin material having yet to be welded.

A body skeleton is configured by the front end portion of the skeleton member 11' of the rocker panel 11, the middle portion of the skeleton member 11' of the rocker panel 11 in the vehicle body front-rear direction, and the front end portion of the skeleton member 16' of the roof side rail 16 being joined by spot welding to the lower end portion of the skeleton member 12' of the front pillar 12, the lower end portion of the skeleton member 13' of the center pillar 13, and the upper end portion of the skeleton member 12' of the front pillar 12, respectively.

Figure 5:
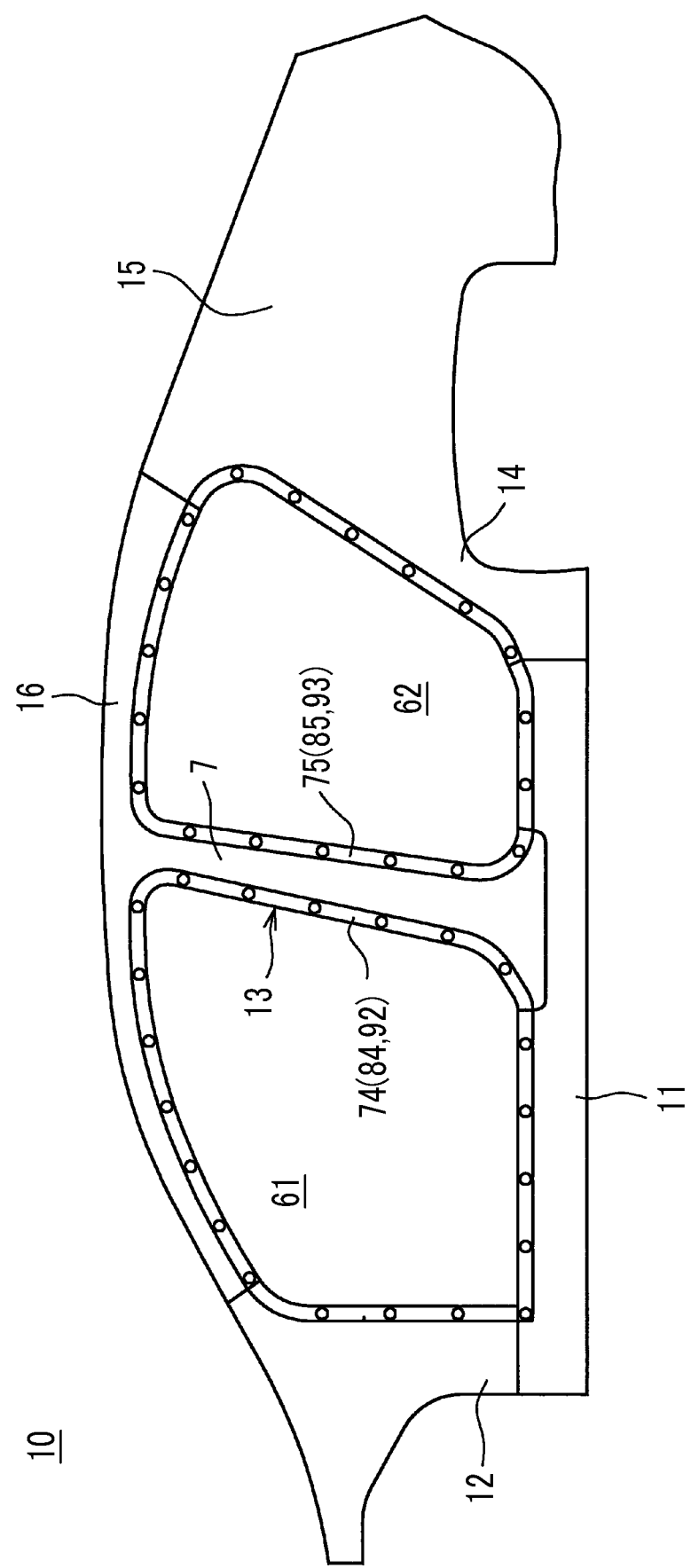
FIG. 5 is a side view of the vehicle body for showing a spot welding place in a spot welding step.

FIG. 5 is a side view of the vehicle body 10 for showing the spot welding places in the spot welding step. The "white circles" in FIG. 5 are the spot welding places. In the spot welding step, the outer panel (side outer panel 7 in the center pillar 13) is superposed with respect to the body skeleton configured by the body skeleton welding step and two metal plates as skeleton members (the center pillar outer reinforcement 8 and the center pillar inner panel 9 in the center pillar 13) and the outer panel (side outer panel 7 in the center pillar 13) are integrally joined by spot welding.

The spot welding step regarding the center pillar 13 will be described below. As illustrated in FIG. 2, the front side flange portion 84 of the center pillar outer reinforcement 8 is superposed on the outside surface of the front side flange portion 92 of the center pillar inner panel 9 (outside surface in the vehicle width direction), the front side flange portion 74 of the side outer panel 7 is superposed on the outside surface of the front side flange portion 84 of the center pillar outer reinforcement 8 (outside surface in the vehicle width direction), and the three flange portions 92, 84, 74 are spot-welded by the spot welding apparatus. Likewise, the rear side flange portion 85 of the center pillar outer reinforcement 8 is superposed on the outside surface of the rear side flange portion 93 of the center pillar inner panel 9 (outside surface in the vehicle width direction), the rear side flange portion 75 of the side outer panel 7 is superposed on the outside surface of the rear side flange portion 85 of the center pillar outer reinforcement 8 (outside surface in the vehicle width direction), and the three flange portions 93, 85, 75 are spot-welded by the spot welding apparatus. The outer panel is spot-welded in the same manner also in the case of another member (such as the rocker panel 11).

The welding places by the spot welding are a plurality of places of each of the flange portions 92, 84, 74, 93, 85, 75 in a longitudinal direction (direction along the opening edges of the door opening portions 61, 62) and are set at positions spaced evenly in the longitudinal direction. The central positions of the welding places by the spot welding are set at the width-direction middle positions of the flange portions 92, 84, 74, 93, 85, 75. The gap (welding pitch) between the welding places by the spot welding is set by experiment or simulation as a dimension at which sufficient vehicle body rigidity and joining strength can be maintained within a range causing no split flow (phenomenon in which a current flowing through a welding place to be welded flows into an already welded welding place present in the vicinity of the welding place). In other words, the gap is set to a dimension at which the torsional rigidity of the vehicle body can be sufficiently obtained and the deformation amount during a vehicle collision can be reduced.

Figure 6B:
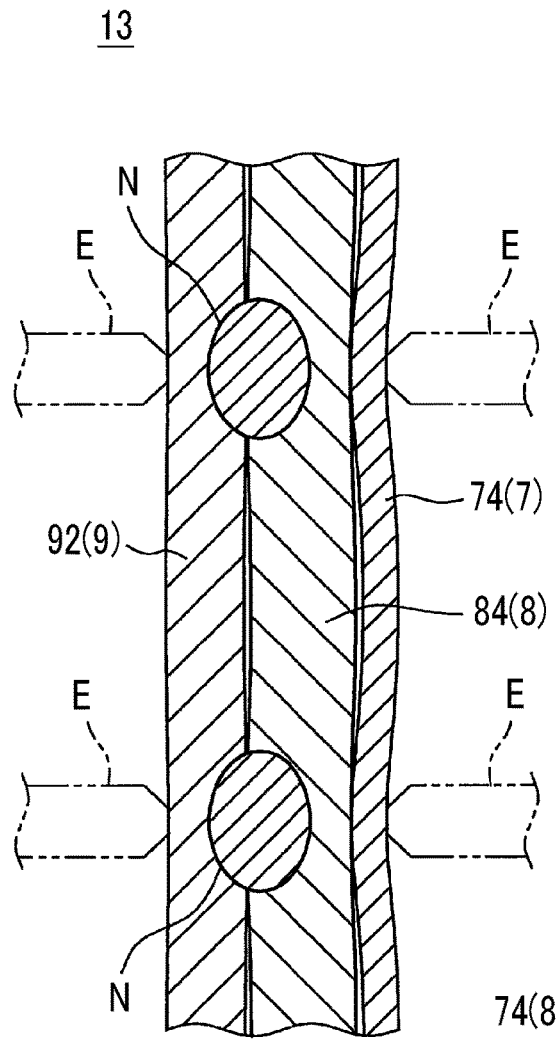
FIG. 6B is a cross-sectional view taken along line VIB-VIB of FIG. 6A.
Figure 6A:
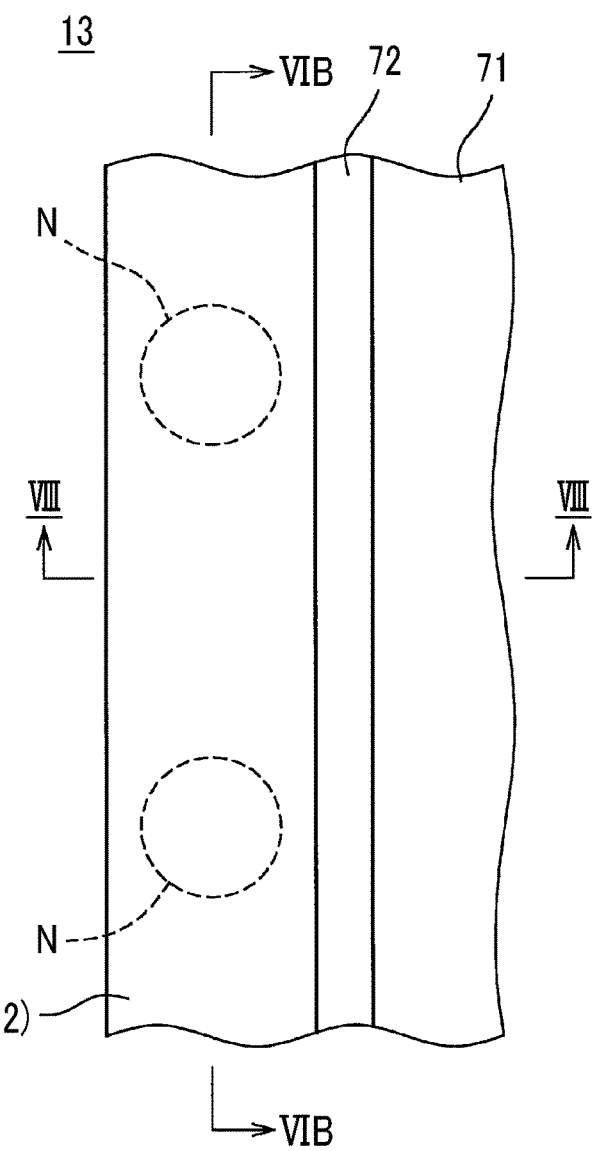
FIG. 6A is an enlarged view of a spot welding part at a time of spot welding step termination.

FIG. 6A is an enlarged view of a spot welding part (spot welding part in the front side flange portions 74, 84, 92) at a time of spot welding step termination, and FIG. 6B is a cross-sectional view taken along line VIB-VIB of FIG. 6A. The imaginary lines in FIG. 6B indicate spot welding electrodes E at a time of spot welding. As illustrated in FIGS. 6A and 6B, when the spot welding step is performed, welding nuggets N are formed in the substantially middle portions of the respective superposed flange portions 74, 84, 92 in the plate thickness direction and the front side flange portion 84 of the center pillar outer reinforcement 8 and the front side flange portion 92 of the center pillar inner panel 9 are integrally welded. The welding place of each of the flange portions 74, 84, 92 is pinched by the spot welding electrodes E, and the gap between the front side flange portion 74 of the side outer panel 7 and the front side flange portion 84 of the center pillar outer reinforcement 8 increases in the region between the welding places of the spot welding (places where the welding nuggets N are formed) by deformation of the front side flange portion 74 of the side outer panel 7 resulting from the above (deformation attributable to pressure welding of the spot welding electrodes E). A similar state occurs also at the spot welding part in the rear side flange portions 75, 85, 93. The laser welding step (described below) is performed in the state as described above.

FIG. 7 is a side view of the vehicle body 10 for showing the laser welding places in the laser welding step. The "dots" in FIG. 7 are the laser welding places with respect to the center pillar 13. In the laser welding step, the laser light is emitted from the laser scanner 3 of the laser welding apparatus 1 with respect to a predetermined place of each of the flange portions 74, 75 of the side outer panel 7 and the respective flange portions 74, 84, 75, 85 of the side outer panel 7 and the center pillar outer reinforcement 8 are melted and integrally joined. The welding pitch of the welding place during the laser welding described above is set smaller than the welding pitch of the welding place during the spot welding. Accordingly, the welding places of the laser welding described above are set in a plurality of places including the place between the welding places of the spot welding. The welding pitch of the laser welding described above is a gap allowing the joining strength of the side outer panel 7 and the center pillar outer reinforcement 8 to be sufficiently maintained and is set by experiment or simulation as a dimension considering productivity (time needed for the laser welding step being shortened to a minimum level needed). The central position of the welding place during the laser welding described above is set at a position closer to the pillar body portion than the width-direction middle positions of the flange portions 74, 84, 92, 75, 85, 93.

The laser welding step will be described below.

Figure 8A:
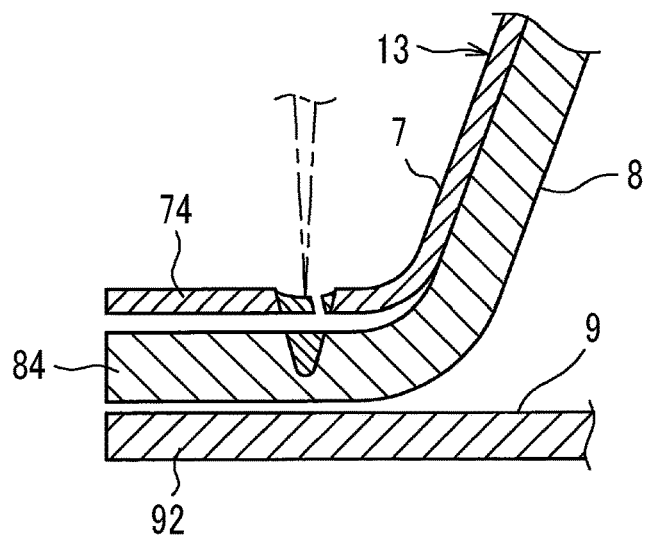
FIG. 8A is a sectional view of a flange portion of the center pillar for showing the laser welding step.
Figure 8B:
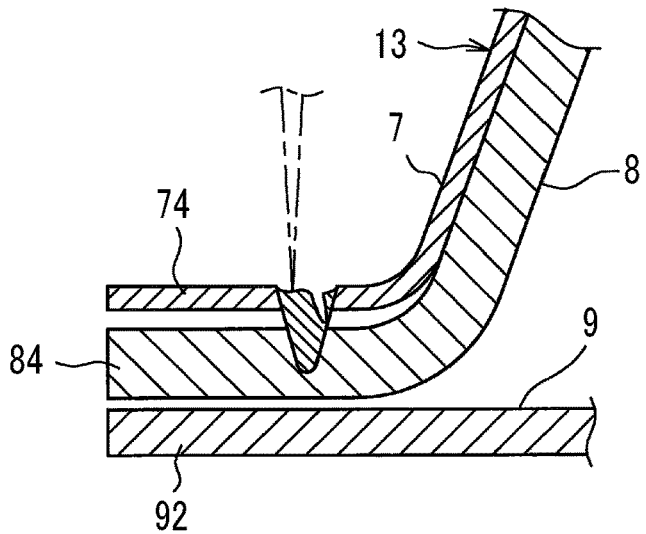
FIG. 8B is a sectional view of the flange portion of the center pillar for showing the laser welding step.
Figure 8C:
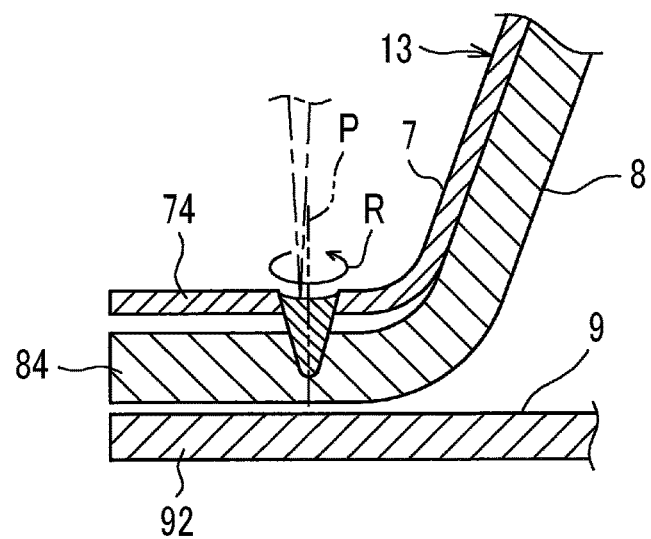
FIG. 8C is a sectional view of the flange portion of the center pillar for showing the laser welding step.

FIGS. 8A to 8C are sectional views of each of the front side flange portions 74, 84, 92 of the center pillar 13 for showing the laser welding step. The sections described above show a part where gaps are generated between the respective flange portions 74, 84, 92 by the pinching (pressure welding) by spot welding electrodes E, which is the intermediate position of the places where the welding nuggets N are formed (corresponding to the cross-sectional part taken along line VIII-VIII of FIG. 6A).

Once the laser welding is initiated, the laser light emitted from the laser scanner 3 of the laser welding apparatus 1 is emitted toward the surface of the side outer panel 7. At this time, the laser welding apparatus 1 performs scanning with the emitted laser such that a circular shape (shape of the side outer panel 7 as seen from the front being a circular shape) is formed by the region that is occupied by the irradiation trajectory of the laser light, melts the metal material of the front side flange portion 74 of the side outer panel 7 and the metal material of the front side flange portion 84 of the center pillar outer reinforcement 8, and forms a molten pool over both described above as illustrated in FIGS. 8A and 8B (first scanning). The condition of the laser light (the light intensity of the laser light, the focal position of the laser light, and so on) in this case is set by experiment or simulation as a value at which the laser light is capable of melting the front side flange portion 74 of the side outer panel 7 and the front side flange portion 84 of the center pillar outer reinforcement 8 without penetrating the front side flange portion 84 of the center pillar outer reinforcement 8. For example, the focal position of the laser light is regarded as the surface of the front side flange portion 74 of the side outer panel 7 and, in this state, the light intensity of the laser light is set such that approximately half of the front side flange portion 84 of the center pillar outer reinforcement 8 in the thickness direction is melted. The above is not limited thereto. Although a configuration in which the circular shape is formed by the irradiation trajectory of the laser light is adopted in the present embodiment, the shape may also be, for example, an elliptical shape.

Subsequently, the laser welding apparatus 1 stirs the molten metal in the molten pool and allows the molten metal to flow by laser light scanning. In other words, laser light scanning is performed such that the laser light rotates toward a predetermined direction (arrow R direction in FIG. 8C) around an axis P penetrating the center of the molten pool (second scanning). As a result, the molten metal is stirred in the molten pool. At this time, the molten pool is formed in a mortar shape by the molten metal flowing in a circumferential direction. At the same time, undulation of the molten metal occurs in the molten pool. The molten pool in which the molten metal undulates is clustered by the surface tension of the molten metal and a perforation- or isolated bead-less joining portion is formed. As a result, the front side flange portion 74 of the side outer panel 7 and the front side flange portion 84 of the center pillar outer reinforcement 8 are integrally welded. The rear side flange portion 75 of the side outer panel 7 and the rear side flange portion 85 of the center pillar outer reinforcement 8 are integrally joined by similar laser welding.

FIG. 9A is an enlarged view of a laser welding part (laser welding part in the front side flange portions 74, 84, 92) at a time of laser welding step termination, and FIG. 9B is a cross-sectional view taken along line IXB-IXB of FIG. 9A. As illustrated in FIGS. 9A and 9B, when the laser welding step is performed, the front side flange portion 74 of the side outer panel 7 and the front side flange portion 84 of the center pillar outer reinforcement 8 are joined to each other in the places irradiated with the laser light (laser welding places formed by the laser light being emitted being indicated by L in the drawings).

The laser welding according to the present embodiment is characterized by the second scanning described above being performed after the first scanning described above is performed.

Assuming that the first scanning is performed without the second scanning being performed, the metal material (molten metal) of the front side flange portion 84 of the center pillar outer reinforcement 8 is gradually cooled whereas the metal material of the front side flange portion 74 of the side outer panel 7 continues to be melted by the first scanning, and then no stirring and mixing is performed between the cooled part described above and a newly melted part. As a result, insufficient melting may arise and a metal material that is not completely melted may be present. The degree of melting of the molten pool as a whole becomes non-uniform by a difference arising between the degrees of melting of the metal material of the front side flange portion 74 of the side outer panel 7 and the metal material of the front side flange portion 84 of the center pillar outer reinforcement 8 in the depth direction of the molten pool, and a lot of bubbles are generated in beads as discharge of the bubbles from the molten pool becomes difficult. Then, sufficient joining strength may not be obtained. Since no stirring and mixing is performed between the cooled part and the newly melted part, the elements of the two parts are not sufficiently diffused and cause segregation, and a non-uniform metal structure is caused by the temperature difference between the two parts. This also may lead to insufficient joining strength.

In the present embodiment, the second scanning is performed after the first scanning is performed. Accordingly, in the molten pool, undulation occurs while the molten metal flows as a result of the laser light scanning, and thus the molten pool is sufficiently melted, stirred, and mixed and bubble discharge is performed in a satisfactory manner. Since the molten pool undulates while flowing as a result of the laser light scanning, the molten pool can be sufficiently melted, stirred, and mixed, the elements can be sufficiently diffused for segregation to be suppressed, and a non-uniform structure can be suppressed based on a uniform temperature. As a result, sufficient joining strength can be obtained.

As described above, in the present embodiment, the three metal plates (the side outer panel 7, the center pillar outer reinforcement 8, and the center pillar inner panel 9) can be integrally joined by the spot welding and the laser welding being used in conjunction with each other. In other words, since the three metal plates are not joined by the spot welding alone, the diameter of the welding nugget does not have to be increased (the diameter of the welding nugget does not have to be increased since the welding nugget does not have to be formed over each metal plate) and the weight of the vehicle body can be reduced by the width dimensions of the flange portions 74, 84, 92, 75, 85, 93 as the respective joining parts of the metal plates 7, 8, 9 being minimized. Since the side outer panel 7 and the center pillar outer reinforcement 8 are joined by the laser welding, the welding nugget for the spot welding does not have to be formed in the side outer panel 7 and the thickness of the side outer panel 7 can be reduced, which also leads to vehicle body weight reduction. In addition, although the spot welding imposes a constraint on a decrease in welding pitch by having the possibility of occurrence of the split flow, sufficient vehicle body rigidity can be maintained by the laser welding free from the welding pitch constraint being used in conjunction. As described above, according to the present embodiment, sufficient vehicle body rigidity can be obtained and vehicle body weight reduction can be achieved at the same time in a case where welding is performed with the side outer panel 7, the center pillar outer reinforcement 8, and the center pillar inner panel 9 superposed.

In the spot welding step, the welding place is pinched by the spot welding electrodes E, and thus the gap between the side outer panel 7 and the center pillar outer reinforcement 8 tends to increase in the region between the spot welding places due to the deformation of the side outer panel 7 that is attributable to the pinching. However, the gap between the side outer panel 7 and the center pillar outer reinforcement 8 is filled with the molten metal by the stirring of the molten pool resulting from the laser light scanning described above, and thus the side outer panel 7 and the center pillar outer reinforcement 8 can be welded in a satisfactory manner.

The laser welding described above is effective also in a case where there is no gap between the side outer panel 7 and the center pillar outer reinforcement 8. In other words, although zinc vapor may explode in the molten metal to result in an empty hole at the joining part in a case where the side outer panel 7 and the center pillar outer reinforcement 8 are galvanized steel plates and there is no gap between the panels in the general laser welding according to the related art, zinc vapor can be discharged in a satisfactory manner by the stirring of the molten pool and a hole becoming empty at the joining part can be suppressed, even in a case where there is no gap between the side outer panel 7 and the center pillar outer reinforcement 8, according to the laser welding of the present embodiment.

In the present embodiment, the spot welding place in the spot welding step and the laser welding place in the laser welding step are designed individually from each other. In other words, the spot welding place imposes no constraint on the laser welding place and the laser welding place imposes no constraint on the spot welding place. Accordingly, the vehicle body 10 can be transported up to the laser welding step place and the laser welding step can be performed after the spot welding step is performed. In a case where the spot welding place imposes a constraint on the laser welding place (case where, for example, the spot welding and the laser welding are performed in the same place), the spot welding step and the laser welding step need to be continuously performed without the vehicle body being transported so that the positional accuracy of the laser welding place is maintained. In this case, the installation spaces of the welding apparatuses for performing each step is hardly maintained in the same welding step place, which results in a lack of practicality. In the present embodiment, however, each step can be implemented in an individual welding step place, and thus practicality is high.

In the present embodiment, the central position of the welding place by the spot welding is set at the width-direction middle position of each of the flange portions 92, 84, 74, 93, 85, 75, and thus the welding nugget N formed by the spot welding can be set to a size effectively using the width-direction length dimensions of the flange portions 92, 84, 74, 93, 85, 75. For example, the diameter of the welding nugget N can be substantially equal to the width-direction length dimensions of the flange portions 92, 84, 74, 93, 85, 75. Accordingly, approximately the diameter of the welding nugget N may be maintained as the width-direction length dimensions of the flange portions 92, 84, 74, 93, 85, 75, and a more-than-needed increase in the width-direction length dimensions of the flange portions 92, 84, 74, 93, 85, 75 can be suppressed. As a result, the joining strength of the center pillar outer reinforcement 8 and the center pillar inner panel 9 by the spot welding can be sufficiently obtained and, at the same time, the width-direction length dimensions of the flange portions 92, 84, 74, 93, 85, 75 can be reduced to the point of contributing to vehicle body weight reduction.

In the present embodiment, the central position of the welding place by the laser welding is set at the position closer to the pillar body portion than the width-direction middle position of each of the flange portions 92, 84, 74, 93, 85, 75, and thus peeling (so-called opening) of the side outer panel 7 and the center pillar outer reinforcement 8 from the respective pillar body portion sides toward the flange portion 84, 74, 85, 75 sides at a time when an external force acts can be effectively suppressed and the joining strength of the side outer panel 7 and the center pillar outer reinforcement 8 can be sufficiently obtained.

In addition, in the present embodiment, the condition of the laser light (the light intensity of the laser light, the focal position of the laser light, and so on) in the laser welding step is set to the value at which the laser light melts the side outer panel 7 and the center pillar outer reinforcement 8 without without penetrating the center pillar outer reinforcement 8 and such that the molten pool can be formed, and thus the side outer panel 7 and the center pillar outer reinforcement 8 can be welded at the minimum laser light energy amount needed for the molten pool formation.

Modification Example

A modification example will be described below. In the present modification example, the center pillar outer reinforcement 8 is a hot stamp material (ultra high tensile steel plate).

During general spot welding, the heat that is generated during the welding causes a heat affected zone (hereinafter, referred to as a HAZ) lower in hardness than a base material (part not affected by the heat) to be formed around a welding nugget. Softening of the HAZ is particularly noticeable in spot welding with respect to a hot stamp material and an ultra high tension material with a tensile strength equal to or greater than a predetermined value.

Figure 10:
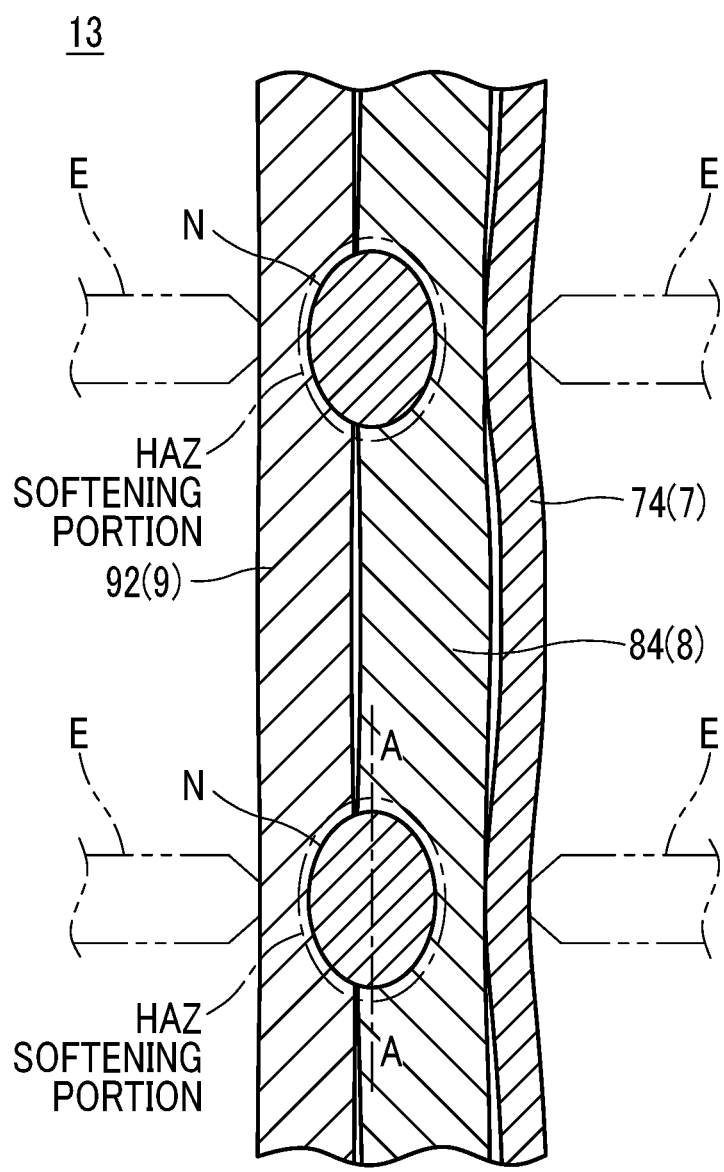
FIG. 10, which corresponds to FIG. 6B, is a diagram illustrating a spot welding step termination time point according to a modification example.
Figure 11:
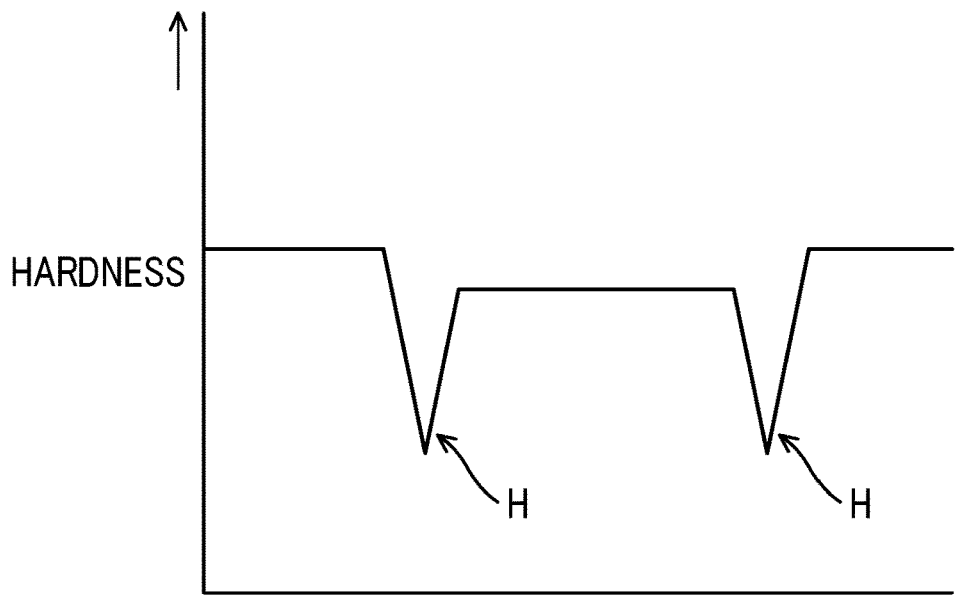
FIG. 11 is a graph illustrating a result of hardness measurement at the one-dot chain line A-A part in FIG. 10.

FIG. 10, which corresponds to FIG. 6B, is a diagram illustrating a spot welding step termination time point in a case where the side outer panel 7 is a mild steel plate, the center pillar outer reinforcement 8 is a hot stamp material, and the center pillar inner panel 9 is a high tension material. In FIG. 10, the regions surrounded by the one-dot chain lines around the welding nuggets N are HAZ parts (hereinafter, also referred to as HAZ softening portions). These regions are lower in hardness than a base material (part not affected by heat), and stress concentration is likely to occur in these regions when an external force acts. FIG. 11 illustrates a result of hardness measurement in the HAZ softening portion and a part other than the HAZ softening portion (result of measurement of the hardness of the one-dot chain line A-A part in FIG. 10). H in FIG. 11 is a part corresponding to the HAZ softening portion.

In the related art, tempering is performed by, for example, furnace heating or post-energization spot welding after spot welding so that a HAZ softening portion and a part other than the HAZ softening portion become close to each other in terms of hardness. This results in prolonged processing time, which is not preferable.

Figure 12B:
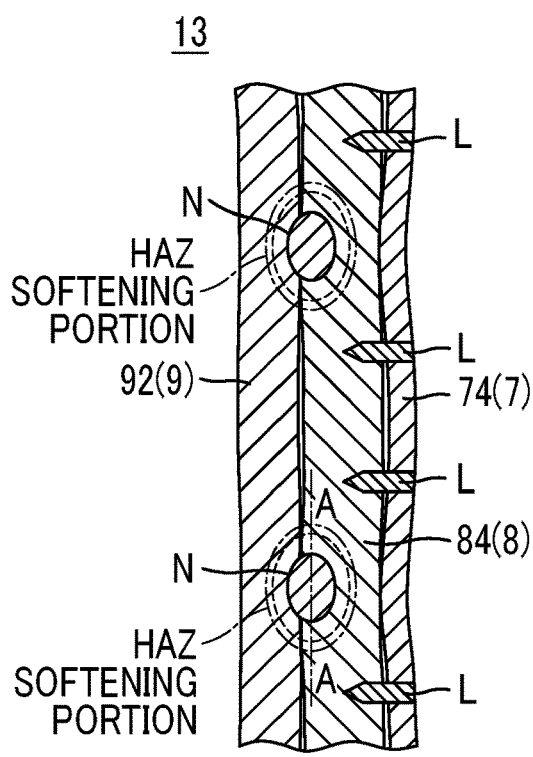
FIG. 12B, which corresponds to FIG. 9B, is a diagram illustrating the laser welding step termination time point according to the modification example.
Figure 12A:
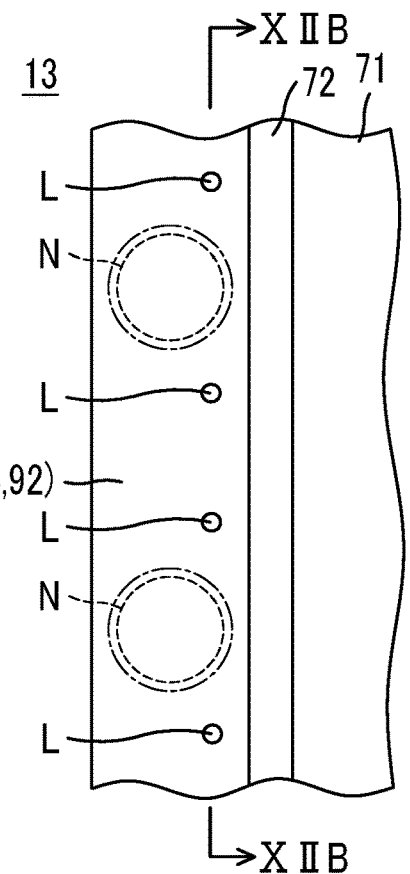
FIG. 12A, which corresponds to FIG. 9A, is a diagram illustrating a laser welding step termination time point according to the modification example.

In the present modification example, LSW is performed as in the case of the above-described embodiment with a position outside the heat affected zone (HAZ softening portion) around the welding nugget (welding place) N for spot welding set as a laser irradiation position, as illustrated in FIG. 12, when the laser welding step is performed after spot welding step termination.

By the laser welding step being implemented, the outside of the HAZ softening portion is heated (heat input is performed thereon), and the vicinity of the HAZ softening portion is tempered as a result. Then, the hardness of the tempered part can become close to the hardness of the HAZ softening portion (can be reduced). FIG. 13 illustrates a result of hardness measurement in the HAZ softening portion and a part other than the HAZ softening portion (result of measurement of the hardness of the one-dot chain line A-A part in FIG. 12). H in FIG. 13 is a part corresponding to the HAZ softening portion. In FIG. 13, the dashed line indicates pre-laser welding step implementation hardness and the solid line indicates post-laser welding step implementation hardness. As illustrated in FIG. 13, by the vicinity of the HAZ softening portion being tempered and the hardness being reduced, stress concentration in the HAZ softening portion is unlikely to occur when an external force acts and member strength improvement can be achieved as a result.

As described above, in the present modification example, the hardness of the vicinity of the HAZ softening portion is allowed to become close to the hardness of the HAZ softening portion by tempering of the vicinity of the HAZ softening portion based on heating of the outside of the HAZ softening portion and implementation of the laser welding step for bonding the side outer panel 7 and the center pillar outer reinforcement 8 being performed at the same time. Accordingly, member strength improvement can be achieved without processing time prolongation.

Although the center pillar outer reinforcement 8 is a hot stamp material in the present modification example described above, the center pillar inner panel 9 may be a hot stamp material instead. Alternatively, both the center pillar outer reinforcement 8 and the center pillar inner panel 9 may be hot stamp materials or at least one of the center pillar outer reinforcement 8 and the center pillar inner panel 9 may be an ultra high tension material.

Another Embodiment

The embodiment disclosed above is illustrative in all respects and is not a basis for limited interpretation. Accordingly, the technical scope is not interpreted solely by the above-described embodiment and the technical scope includes every change equivalent in meaning.

For example, the welding method for integrally joining each metal plate constituting the center pillar 13 has been described in the above-described embodiment. However, a welding method for integrally joining each metal plate constituting the other members around the door opening portions such as the rocker panel 11, the front pillar 12, the rear pillar 14, and the roof side rail 16 is also applicable.

In the embodiment and the modification example described above, the central position of the welding place by the laser welding is set at the position closer to the pillar body portion than the width-direction middle position of each of the flange portions 92, 84, 74, 93, 85, 75. The central position of the welding place by the laser welding may also be set at the width-direction middle position of each of the flange portions 92, 84, 74, 93, 85, 75.

In the embodiment and the modification example described above, the central position of the welding place by the spot welding is set at the width-direction middle positions of the flange portions 92, 84, 74, 93, 85, 75. The central position of the welding place by the spot welding may also be set at the positions closer to the pillar body portion than the width-direction middle positions of the flange portions 92, 84, 74, 93, 85, 75. For example, the central position of the welding place by the spot welding may be set at the position closer to the pillar body portion than the central position of the welding place by the laser welding. According to the above, peeling can be suppressed mainly by the welding place by the spot welding (spot welding point) and peeling of the welding place by the laser welding (laser welding point) can be suppressed even in the event of an external force acting on the side outer panel 7 and the center pillar outer reinforcement 8 to cause peeling from the respective pillar body portion sides toward the flange portion sides. The above-described effect is obtained insofar as the central position of the welding place by the spot welding is set at the position closer to the pillar body portion than the central position of the welding place by the laser welding. Accordingly, the above-described effect is obtained also in a case where the central position of the welding place by the spot welding is set at the width-direction middle positions of the flange portions 92, 84, 74, 93, 85, 75 and the central position of the welding place by the laser welding is set at the position closer to the side opposite to the pillar body portion than the width-direction middle position of each of the flange portions 92, 84, 74, 93, 85, 75.

A case where the three metal plates (the side outer panel 7, the center pillar outer reinforcement 8, and the center pillar inner panel 9) are welded has been described in the above-described embodiment. However, the disclosure is not limited thereto and is applicable also in a case where four or more metal plates are welded. In this case, the metal plates other than the side outer panel (surface plate) 7 are joined by spot welding and the side outer panel 7 and the metal plate adjacent thereto (such as the center pillar outer reinforcement 8) are joined by laser welding.

The disclosure is applicable to welding by which each panel constituting a pillar around a door opening portion of a vehicle body is integrally joined.

What is claimed is:

1. A welding method for integrally welding three or more superposed metal plates constituting a member around a door opening portion of a vehicle body and including a surface plate positioned on a vehicle body surface side, a first vehicle body structure plate adjacent to a vehicle cabin inside of the surface plate, and a second vehicle body structure plate adjacent to a vehicle cabin inside of the first vehicle body structure plate, the welding method comprising:
   a spot welding of joining the first vehicle body structure plate and the second vehicle body structure plate by spot welding in a plurality of places along an opening edge of the door opening portion in a state where each of the metal plates is superposed; and
   a laser welding of joining the surface plate and the first vehicle body structure plate in a plurality of places including a place between welding places of the spot welding after the spot welding, the joining being performed by emitting laser light to the surface plate and by scanning the laser light to stir a molten pool including a molten metal of the surface plate and the first vehicle body structure plate melted by the laser light.

2. The welding method according to claim 1, wherein a condition of the laser light in the laser welding is set to a value at which the laser light melts the surface plate and the first vehicle body structure plate without penetrating the first vehicle body structure plate and such that the molten pool is allowed to be formed.

3. The welding method according to claim 1, wherein:
- at least one of the first vehicle body structure plate and the second vehicle body structure plate is an ultra high tensile steel plate;
- the surface plate is a steel plate lower in hardness than the first vehicle body structure plate and the second vehicle body structure plate; and
- the surface plate and the first vehicle body structure plate are bonded by laser light being emitted to an outside of a heat affected zone around the welding place of the spot welding in a laser welding performed after the spot welding.

* * * * *